US009053000B1

(12) United States Patent
Lam et al.

(10) Patent No.: US 9,053,000 B1
(45) Date of Patent: Jun. 9, 2015

(54) METHOD AND APPARATUS FOR EVENT CORRELATION BASED ON CAUSALITY EQUIVALENCE

(71) Applicant: EMC CORPORATION, Hopkinton, MA (US)

(72) Inventors: Cheuk Lam, Yorktown Heights, NY (US); Sathyanarayana Singh, White Plains, NY (US); Prasanna S. Patil, Scarsdale, NY (US); Chao-Wei Ou, Poughkeepsie, NY (US); David W. Moran, Holly Springs, NC (US); Steve J. Song, South Salem, NY (US)

(73) Assignee: EMC CORPORATION, Hopkinton, MA (US)

( * ) Notice: Subject to any disclaimer, the term of this patent is extended or adjusted under 35 U.S.C. 154(b) by 235 days.

(21) Appl. No.: 13/628,706

(22) Filed: Sep. 27, 2012

(51) Int. Cl.
*G06F 11/00* (2006.01)

(52) U.S. Cl.
CPC .................................... *G06F 11/006* (2013.01)

(58) Field of Classification Search
USPC .................. 714/26, 27, 37, 33; 709/225–225
See application file for complete search history.

(56) References Cited

U.S. PATENT DOCUMENTS

| | | | | |
|---|---|---|---|---|
| 6,006,016 | A * | 12/1999 | Faigon et al. | 714/48 |
| 6,249,755 | B1 * | 6/2001 | Yemini et al. | 702/183 |
| 6,347,374 | B1 * | 2/2002 | Drake et al. | 726/1 |
| 7,016,954 | B2 * | 3/2006 | McKenzie et al. | 709/224 |
| 7,349,826 | B2 * | 3/2008 | Subramanian et al. | 702/185 |
| 7,500,142 | B1 * | 3/2009 | Cowart et al. | 714/25 |
| 7,552,443 | B2 * | 6/2009 | Upton | 719/315 |
| 8,301,755 | B2 * | 10/2012 | De Peuter et al. | 709/224 |
| 8,479,048 | B2 * | 7/2013 | Morimura et al. | 714/26 |
| 2005/0114487 | A1 * | 5/2005 | Peng et al. | 709/223 |
| 2007/0192859 | A1 * | 8/2007 | Shahar et al. | 726/22 |
| 2009/0070463 | A1 * | 3/2009 | Cowart et al. | 709/224 |
| 2011/0029960 | A1 * | 2/2011 | Cimadamore et al. | 717/141 |
| 2011/0055138 | A1 * | 3/2011 | Khanduja et al. | 706/47 |
| 2011/0314330 | A1 * | 12/2011 | Morimura et al. | 714/26 |
| 2011/0320874 | A1 * | 12/2011 | Shimada et al. | 714/37 |
| 2012/0221314 | A1 * | 8/2012 | Bourlatchkov et al. | 703/21 |
| 2012/0221589 | A1 * | 8/2012 | Shahar et al. | 707/758 |
| 2012/0253773 | A1 * | 10/2012 | Cheon et al. | 703/13 |
| 2012/0297061 | A1 | 11/2012 | Pedigo et al. | |
| 2013/0035976 | A1 * | 2/2013 | Buffett | 705/7.26 |
| 2013/0166724 | A1 * | 6/2013 | Bairavasundaram et al. | 709/224 |
| 2014/0237297 | A1 * | 8/2014 | Nagura et al. | 714/39 |

OTHER PUBLICATIONS

U.S. Appl. No. 13/435,017 Office Action dated Mar. 7, 2014, 19 pages.
U.S. Appl. No. 13/435,017, filed Mar. 30, 2012, He, et al.
U.S. Appl. No. 13/536,512, filed Jun. 28, 2012, Zhang, et al.
U.S. Appl. No. 13/536,726, filed Jun. 28, 2012, Lam, et al.
Vblock Infrastructure Platforms Series 300 Architecture Overview, Version 2.4, Aug. 2011, The Virtual Computing Environment Company, www.vce.com, 74 pages.

(Continued)

*Primary Examiner* — Bryce Bonzo
(74) *Attorney, Agent, or Firm* — Daly, Crowley, Mofford & Durkee, LLP

(57) ABSTRACT

Methods and apparatus to provide event correlation based on causality equivalence. In one embodiment, a raw notification and a causality notification are generated for a raw event. The causality notification corresponds to a causality equivalence class in a plurality of causality equivalence classes.

19 Claims, 19 Drawing Sheets

(56) References Cited

OTHER PUBLICATIONS

Cisco Unified Computing System and EMC VNXe3300 Unified Storage System, White Paper, Jan. 2011, Revision 1.0, EMC², Cisco Systems, Inc., 170 West Tasman Drive, San Jose, CA 95134-1706, www.cisco.com, 9 pages.

EMC Integrated Infrastructure for VMware Enabled by EMC VNXe3100 and VMware vSphere 4.1, An Architectural Overview, White Paper, EMC Global Solutions, EMC², Feb. 2011, 24 pages.

VMware vStorage APIs for Array Integration with EMC VNX Series for NAS, Benefits of EMC VNX for File Integration with VMware VAAI, White Paper, EMC Solutions Group, Jan. 2012, EMC², 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 75 pages.

U.S. Appl. No. 13/435,017, filed Mar. 30, 2012, 93 pages.
U.S. Appl. No. 13/536,512, filed Jun. 28, 2012, 83 pages.
U.S. Appl. No. 13/536,726, filed Jun. 28, 2012, 73 pages.
U.S. Appl. No. 13/536,512 Office Action dated May 15, 2014, 19 pages.

* cited by examiner

Port Failure in SAN
37 raw alerts received

| Domain | Raw Alert | Count (37) | Correlation |
|---|---|---|---|
| SAN Switch | linkDown (SAN port down) | 1 | Root cause |
| UCS | UCSFcPLO port-failed (FC uplink down) | 1 | Peer of the SAN port (matched via WWNs) |
| UCS | UCSAdaptorHostFcIf link-down (Host HBA down) | 4 | Sharing the same VSAN with the SAN port |
| UCS | UCSDcxVif vif-down (Virtual interface down) | 4 | Virtual interfaces layered over the host HBA |
| UCS | UCSDcxVc link-down (Virtual circuit down) | 4 | Virtual circuits connecting the virtual interfaces to FIC |
| vCenter | EsxProblemStorageRedundancyDegraded | 10 | Caused by host HBA down |
| vCenter | EsxProblemStorageRedundancyLost | 13 | Caused by host HBA down |

FIG. 6

METHOD AND APPARATUS FOR EVENT CORRELATION BASED ON CAUSALITY EQUIVALENCE

BACKGROUND

As is known in the art, cloud computing systems, even in pro-architected and pre-qualified environments, contain a relatively large number of hardware devices and components and software applications, modules, and components. In the presence of a fault, alert, or other condition needing attention, it can be difficult to identify the source of the fault or alert since there are many complex components that may be provided by multiple vendors which may make it difficult to correlate information to an efficient manner.

For example, in a cloud computing environment, alerts and events from various event sources in platforms normally contain limited information that may not be meaningful and may seem unrelated to the environment from which they originate. It is challenging for IT personnel to extract executable data from the alerts and take appropriate action.

With large volumes of alerts/events constantly coming from various sources, it is time consuming to troubleshoot all of them all my prioritization. It is challenging to prioritize the alerts/events and take appropriate actions without correlating them and knowing which of the alerts or events are root causes and which are just symptoms. In addition, many of the IT resources are managed in silos by IT personnel specialized in certain technology domains. For example, when a blade in the Cisco Unified Computing System (UCS) fails or has performance issues its impact propagates to the ESX server deployed on the blade, to the virtual machines deployed on the ESX server, to the applications or critical services running on those virtual machines, to the critical business that relies on those services. It may take hours or even days to sort through those alerts or events, which may result in significant detrimental impact on an enterprise.

Some existing products do not correlate events from external sources. They poll stains directly from the sources and generate their own events. There is no correlation between the events they generate and the events from the sources.

Some other products in the market, such as VMware vCenter Operations, do loose correlation based on topology relationship only. They do not account for the fact that different events on the same object may have different causality. For example, the two events of blade, "inoperable" and "unreachable", have different symptoms. The former implies the ESX in the blade is definitely not functioning, while the latter simply means it cannot be reached but it may still be functioning.

SUMMARY

Exemplary embodiments of the invention provide event correlation based on causality equivalence. Vblock leverages VMware, Cisco, and EMC packages with integrated computing, network, storage, and management capabilities. The UIM/Operations product collects events from the silo management systems in Vblock and performs event correlation— figuring out which events are the causes and which are the symptoms to which operators need not pay as much attention.

Each event source generates a large number of event types. For example, the Cisco UCSM has over 150 fault types. If one were to write rules (or models) for each event to be correlated, then the complexity would be extremely high. It has been observed that, from the perspective of causality, one event could be equivalent to another, i.e., the two events have the same set of possible root causes, and the same set of symptoms. With this knowledge, events can be categorized into a set of causality-equivalence event classes, and a correlation model developed based only on the set of equivalence classes. This drastically reduces the complexity of the correlation model, because the cardinality of the set of equivalence classes could be an order of magnitude less than the number of event types to be correlated. For example, the two dozens of blade faults in UCS fell into just two causality-equivalence classes: Inoperable or Unreachable.

In one aspect of the invention, a method comprises receiving a raw event, generating, using a computer processor, a raw notification and a causality notification for the raw event, mapping the raw event to the causality notification which corresponds to a causality equivalence class in a plurality of causality equivalence classes, creating a name for the causality notification including a type, instance, and event, creating a two-way relationship between the raw notification and the causality notification, updating a status attribute of a topology object corresponding to the raw event, examining the causality notification to identify other related causality notifications, updating a relationship of the causality notification to the other related causality notifications, and retrieving a causality notification based on the name of the causality notification.

In another aspect of the invention, a system comprises: a notification manager to manage a raw notification for a raw event and a causality notification for the raw event, wherein the causality notification corresponds to a causality equivalence class in a plurality of causality equivalence classes, correlation engine for maintaining a state of topology objects and for computing relationships among notifications generated on the states of the topology objects, an event processor to generate from the raw event the raw notification and the causality notification and to update the status of the topology objects in the correlation engine, and a causality processor to retrieve further causality notifications caused by the causality notification generated by the raw event and to update causality relationships between the further causality notifications and the causality notification generated by the raw event.

In a further aspect of the invention, an article comprises: a computer-readable medium comprising non-transitory stored instructions that enable a machine to perform: receiving a raw event, generating, using a computer processor, a raw notification and a causality notification for the raw event, mapping the raw event to the causality notification which corresponds to a causality equivalence class in a plurality of causality equivalence classes, creating a name for the causality notification including a type, instance, and event, creating a two-way relationship between the raw notification and the causality notification, updating a status attribute of a topology object corresponding to the raw event, examining the causality notification to identify other related causality updating a relationship of the causality notification to the other related causality notifications, and retrieving a causality notification based on the name of the causality notification.

BRIEF DESCRIPTION OF THE DRAWINGS

The foregoing features of this invention, as well as the invention itself, may be more fully understood from the following description of the drawings in which:

FIG. 6 is a tabular representation of alerts caused by a single failure in a pre-architected and pre-qualified cloud computing system;

DETAILED DESCRIPTION

Figure 1:
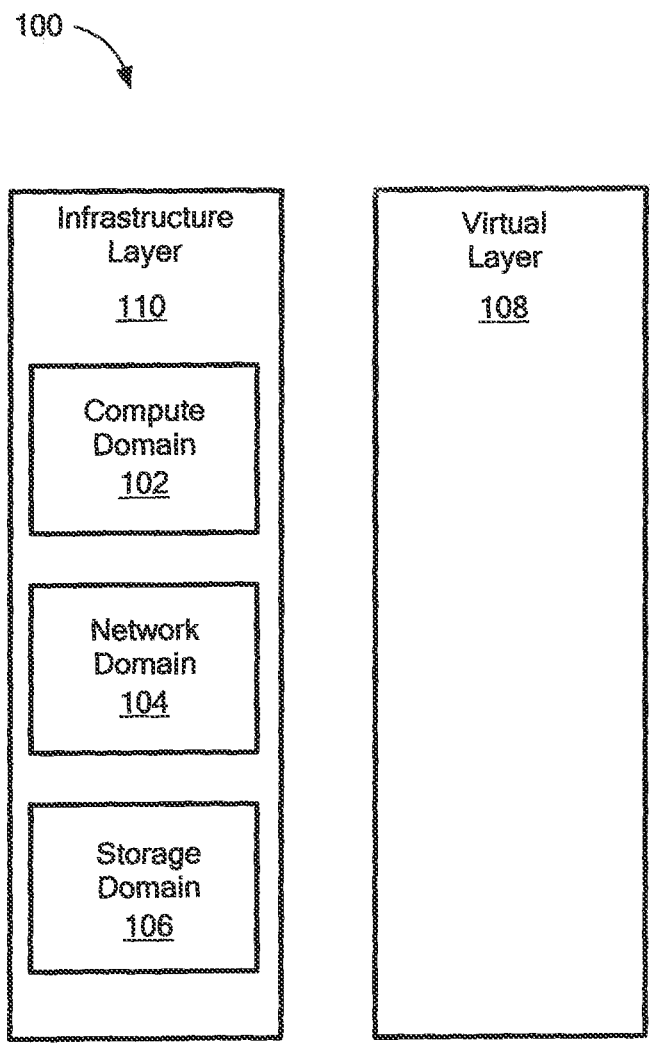
FIG. 1 is a high level schematic representation of a cloud computing system having event correlation based on causality equivalence in accordance with exemplary embodiments of the invention.

FIG. 1 shows an exemplary cloud computing environment 100 having event correlation based upon causality equivalence in accordance with exemplary embodiments of the invention. The environment includes an infrastructure layer 110 and a virtual layer 108. The infrastructure layer 110 is further divided into compute domain 102, a network domain 104, and a storage domain 106. The environment may be referred to as a platform. It is understood that any practical number of platforms can be combined into a cloud computing environment.

The compute domain 102 comprises components, such as blade servers, chassis and fabric interconnects that provide the computing power for the platform. The storage domain 106 comprises the storage components for the platform. The network domain 104 comprises the components that provide switching and routing between the compute and storage domains 102, 106 within and between platforms, and to the client or customer network.

Figure 2:
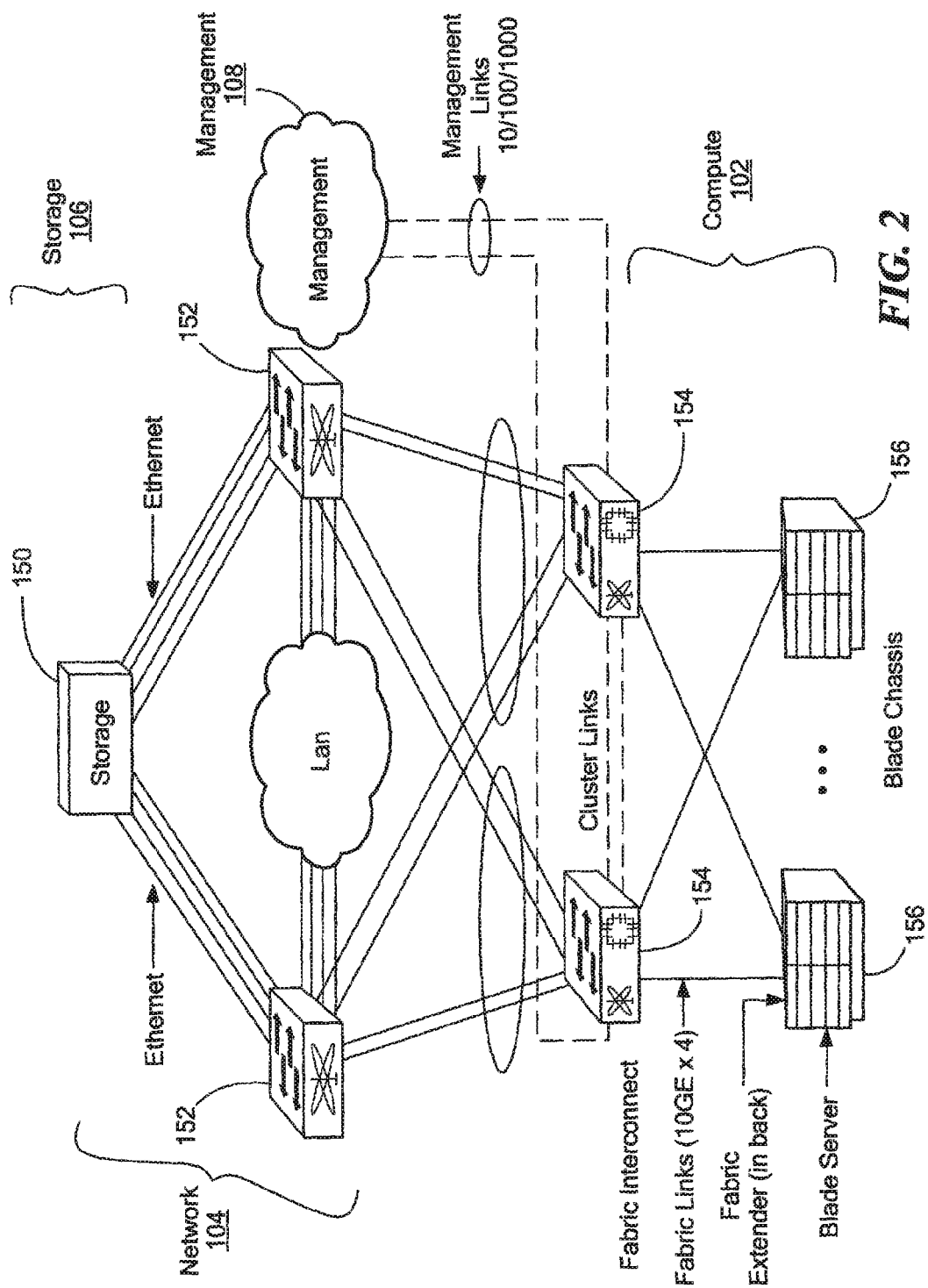
FIG. 2 is a schematic representation showing further detail of a pre-architected and pre-qualified cloud computing system of FIG. 1 including interconnections.

FIG. 2 shows further detail for the environment 100 of FIG. 1. The storage domain 106 can include storage components 150, such as CLARIION storage components from EMC Corporation of Hopkinton Mass. The network domain 104 can include a pair of switches 152, such an MDS 9000 Series Multilayer SAN Switches from Cisco of San Jose, Calif., coupled to the storage components and to a LAN. The compute domain 102 can include a pair of fabric interconnects 154, such as CISCO 6100 series devices. The compute domain can further include a number of blade servers 156, such as CISCO 5100 blade chassis.

Figure 3:
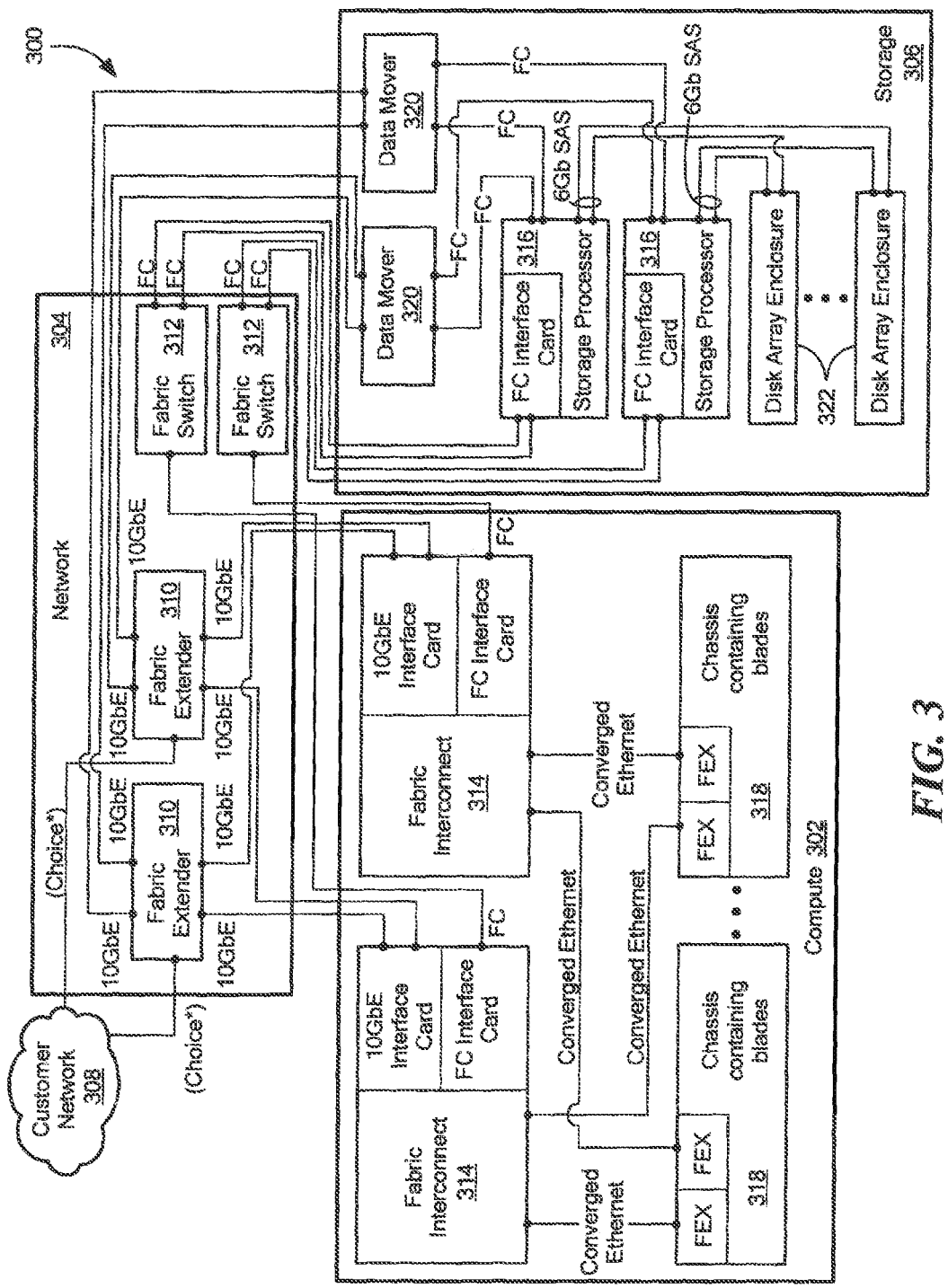
FIG. 3 is a schematic representation showing further detail of a pre-architected and pre-qualified cloud computing system of FIG. 2 including system components.
Figure 4:
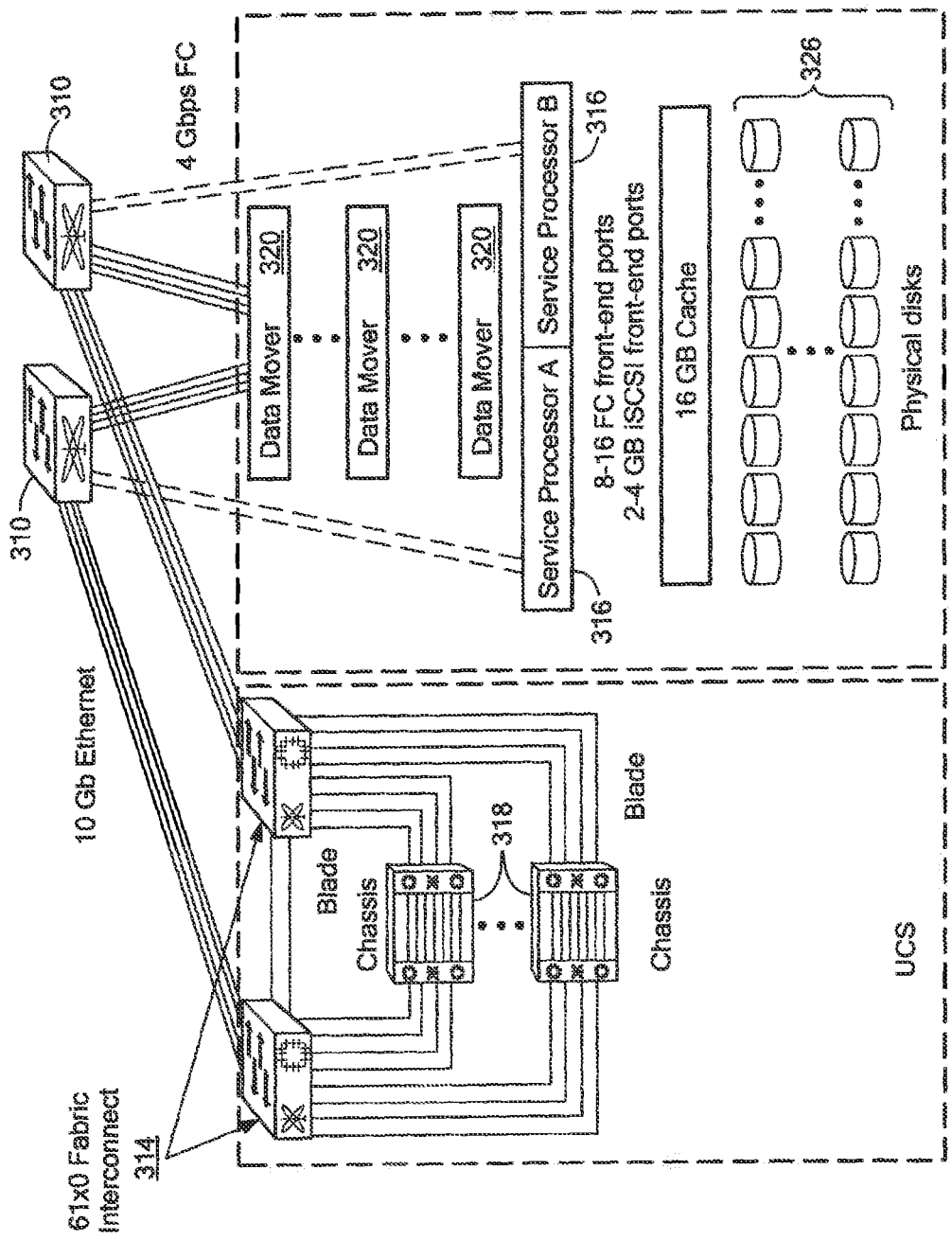
FIG. 4 is a schematic representation showing further detail of a storage domain of the cloud computing system of FIG. 3 using NAS fox the storage domain.

FIG. 3 shows further detail of an exemplary cloud environment having a compute domain 302, a network domain 304 and a storage domain 306. The network domain 302 is coupled to a customer network 308 in a manner known in the art. The network domain 302 includes switches 310 coupled to the customer network 308. The network domain 302 also includes multilayer fabric switches 312 coupled to fabric interconnects 314 in the compute domain 302 and to storage processors 316 in the storage domain 306. The fabric interconnects 314 are coupled to blade server chassis 318 containing blades. Data movers 320 in the storage domain 306 are coupled between the storage processors 316 and the switches 310 in the network domain. Disk array enclosures 322 are coupled to the storage processors 316. FIG. 4 shows interconnections for a system similar to that shown in FIG. 3 with physical disks 326. In the illustrated embodiment, the storage domain includes 8 to 16 front end fibre channel ports and 2-4 GB iSCSI front end ports. It is understood that a variety of other configurations having different interconnections and storage configuration can be provided to meet the needs of a particular application.

The virtual layer can include a number of applications to perform various functions for overall control, configuration, etc of the various platform components. For example, virtual layer applications can include a virtualization function, such as VSPHERE/VCENTER, by VMware of Palto Alto, Calif.

Each of the infrastructure domains and the virtual layer is managed by a separate element management system. One of such element management systems is the Unified Computing System (UCS) Manager by Cisco. It is understood that the blade chassis and fabric interconnection can be considered part of the UCS. Another management application can include a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
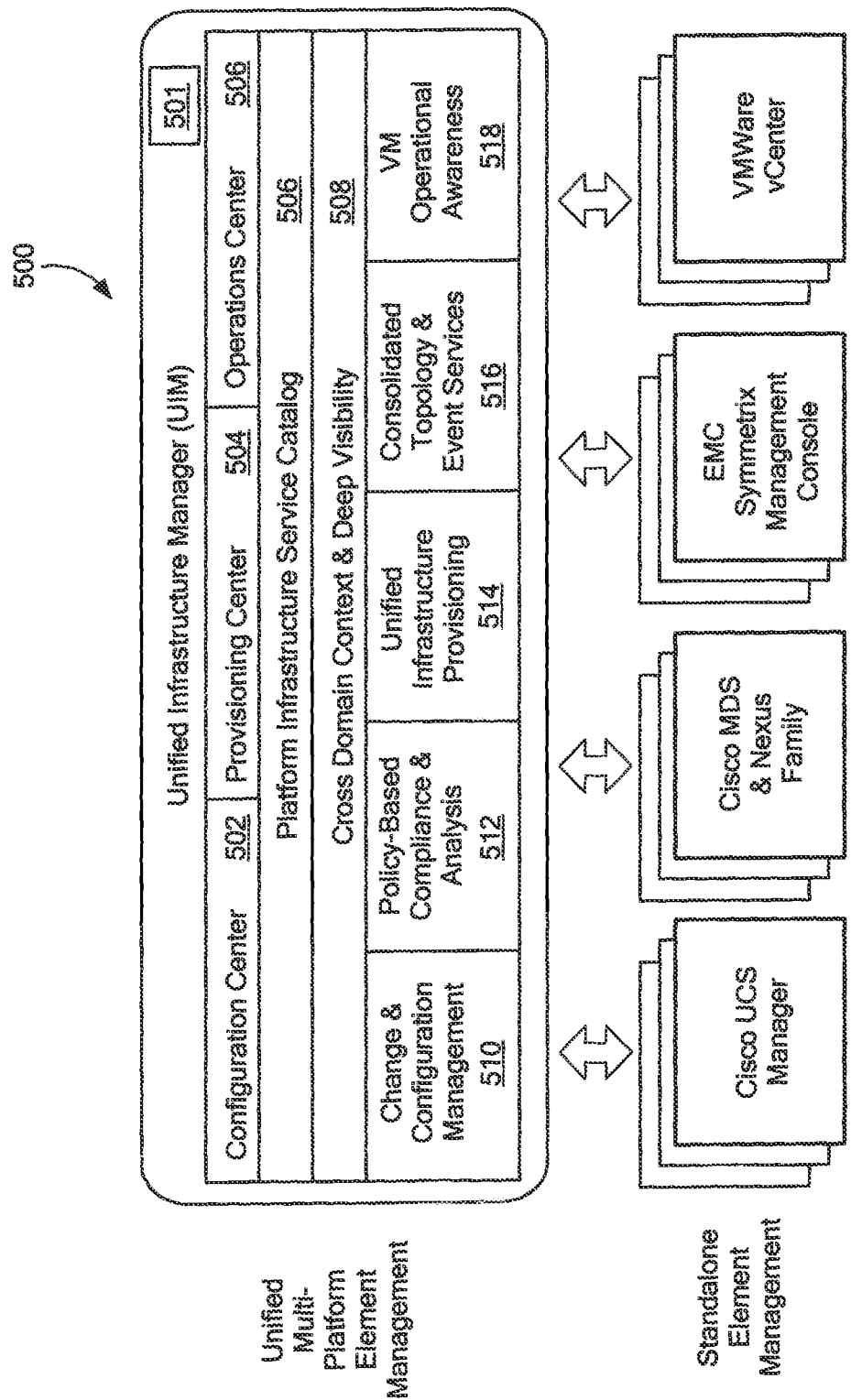
FIG. 5 is a schematic representation of a unified infrastructure manager (UIM) module showing component layering.

FIG. 5 shows an exemplary unified infrastructure manager 500. In one embodiment, the unified infrastructure manager 500 includes a configuration center module 502, a provisioning center module 504, and an operations center module 506 having cross domain event correlation in accordance with exemplary embodiments of the invention. Below these modules are a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage domains, and other management applications.

The unified infrastructure manager 500 performs platform deployment by abstracting the overall provisioning aspect of the platform(s) and offering granular access to platform components for trouble shooting and fault management.

In one aspect of the invention, a uniform infrastructure management module includes a cross domain event correlation module to process alerts from physical infrastructure, logical services, virtual applications, and tenant/organizations. It is understood that cloud environments can provide storage for multiple tenant/organizations.

For example, a Vblock leverage VMware, Cisco, and EMC packages with integrated computing, network, storage, and management capabilities. Each of the domains has its own management system. When a component, for example, fails, multiple domain management systems may report an alert indication representing the same failure. For example, when a UCS port fails, a fault is triggered in the UCS. At the same time, vCenter also reports an alarm on the corresponding VMNIC. These two events indicate the same failure. To correlate duplicate events across different domains, the affected objects are matched using unique identifiers. In one embodiment, the following is used to perform matching and event correlation: UCS/vHBA and vSphere/vmhba using WWPN; match UCS/FCPort and MDS/FCPort using WWPN; match UCS/Blade and vCenter/ESX using UUID; match Storage/Volume and vCenter/Datastore using UUID; and matching StoragePort and vCenter/ScsiTarget using WWPN.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

WWPN: World Wide Port Name

UUID: Universally Unique Identifier

HBA: Host Bus Adapter

NIC: Network Interface Card

FC: Fiber Channel

The cloud computing environment is broken up into layers: infrastructure (or physical) layer and the virtual layer. In exemplary embodiments, the infrastructure layer is divided into three domains (silos): compute, network, storage, because traditionally they are managed separately with respective element management systems.

FIG. 6 shows an exemplary representation 600 of a port failure in a SAN component listing the domain 602, raw alert 604, alert count 606, and correlation 608, which are described below in detail. In the SAN switch domain 610, there is a link down 612, which is the root cause 614 of the alert as shown in the correlation column. The alert count 616 is one.

The UCS domain 620 lists a series of raw alerts 622 generated by the SAN port failure in SAN switch domain. As can be seen, the UCS alerts 622 include a FC link down, a host HBA down, a virtual interface down, and a virtual circuit down for a count of 13 in the UCS domain, The vCenter domain 624 has two raw alerts 626 with a total count of 23 alerts (10+13). A total of 37 alerts are generated in three domains due the root cause SAN port failure.

Figure 7:
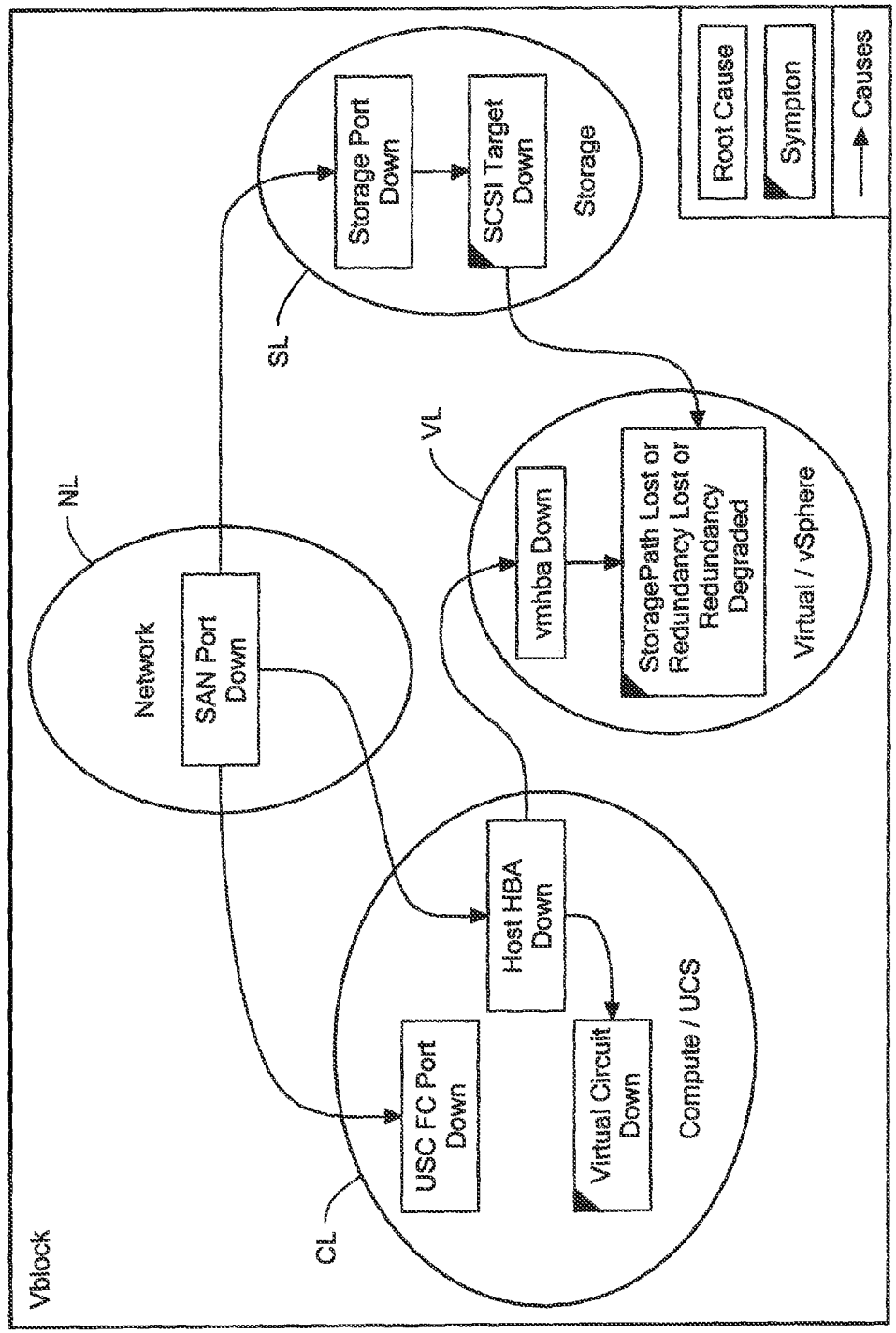
FIG. 7 is a schematic representation of cross-domain event correlation.

FIG. 7 shows an exemplary representation of cross domain event correlation for root cause events generated in a network domain NL, compute domain CL, storage domain SL, and virtual layer VL. The root causes have respective symptoms. For example, a host HBA down in the compute domain CL has as a symptom a virtual circuit down. While a domain management system may correlate events within that domain, cross-domain event correlation correlates events across the various domains, as described more fully below.

Figure 8:
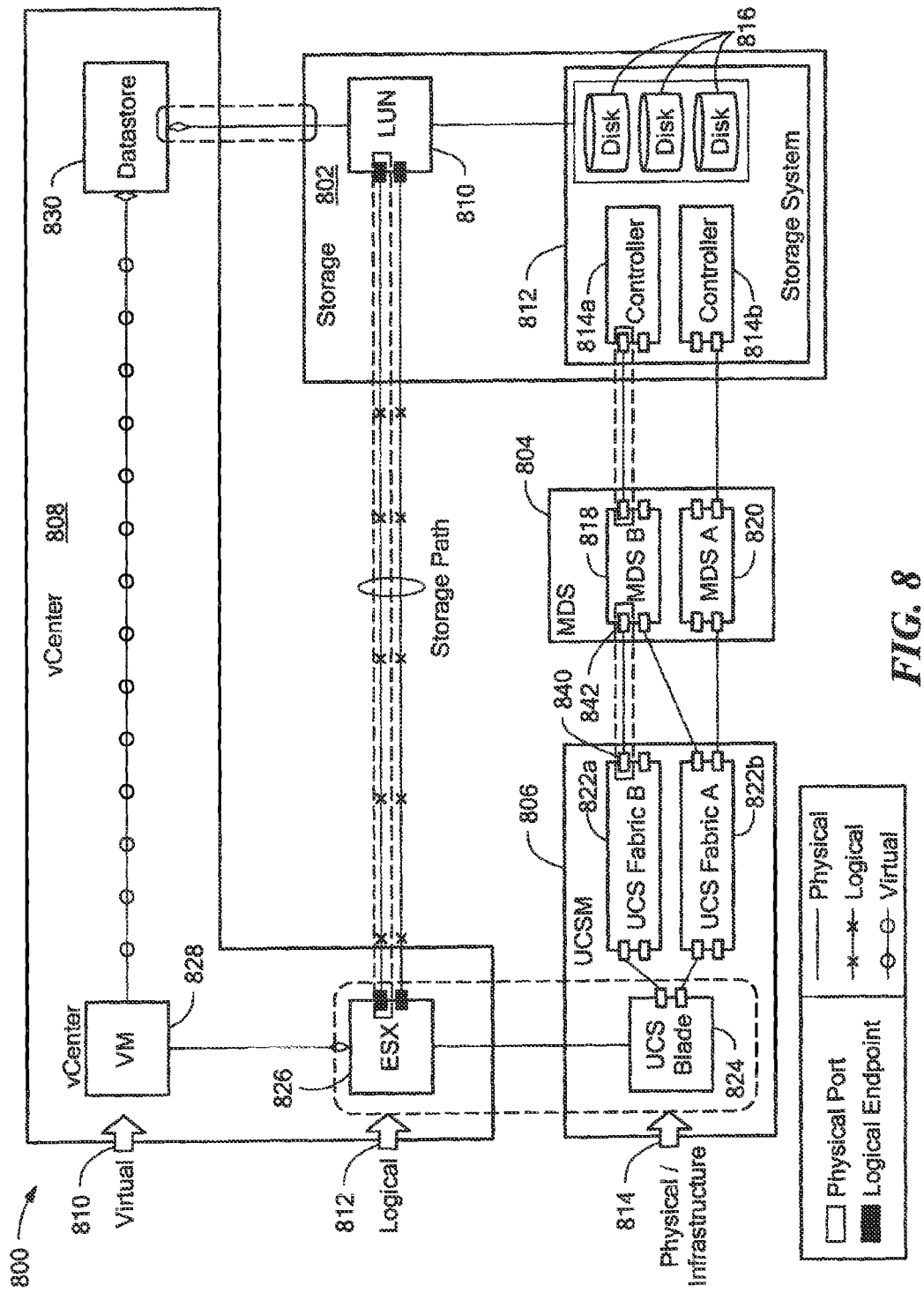
FIG. 8 is a schematic representation of an exemplary system having domains and layers.

FIG. 8 shows cross domain matching with connectivity and identity of components. The exemplary system 800 includes a storage domain 802, a network domain 804, a compute domain 806 and a virtual 808. The system is shown having a virtual layer 810, a logical layer 812, and a physical infrastructure layer 814.

Each of the storage 802, network 804, compute 806 domains and the virtual layer is managed by respective element management systems. In an exemplary embodiment, cross-domain correlation establishes relationships between objects in different domains or layers, as shown in the dashlined boxes.

The storage domain 802 comprises a LUN 810 and a storage system 812 having first and second controllers 814a,b and disk arrays 816. The network domain 804 comprises first and second switches 818, 820 coupled between the storage domain 802 and the compute domain 806, which includes first and second fabric switches 822a,b and a UCS blade 824. The virtual layer 808 comprises an ESX server 826, a virtualization application 828, such as VM, and a datastore application 830. As can be seen, the components, domains and layers are connected by physical, logical and transaction connections. For example, physical connections between ports are shown between the first UCS fabric switch B 822a and the first network switch 818. A cross-domain logical connection is shown between the ESX server 826 and the storage LUN 810. A virtual connection is shown between VM 828 and the datastore 830.

In one particular embodiment, first and second categories of alert matching include connectivity matching and identity matching. For connectivity matching, a port 840 in the UCS fabric 822a is connected to a port 842 in the MDS switch via a cable. If the MDS reports that port 842 is down, then it is very likely the UCSM 806 will also report the connected UCS port 840 down. The system stores port-to-port connectivity for the components in the domains.

For identity matching, the same storage volume is represented in both the storage system and the vCenter/vSphere environment, for example. If there is a failure on the storage volume 810, the management systems for the storage domain 802 and the virtual layer 808 will report an alert. The two alerts in the different domains are reconciled to determine the root cause, as described more fully below.

Figure 9:
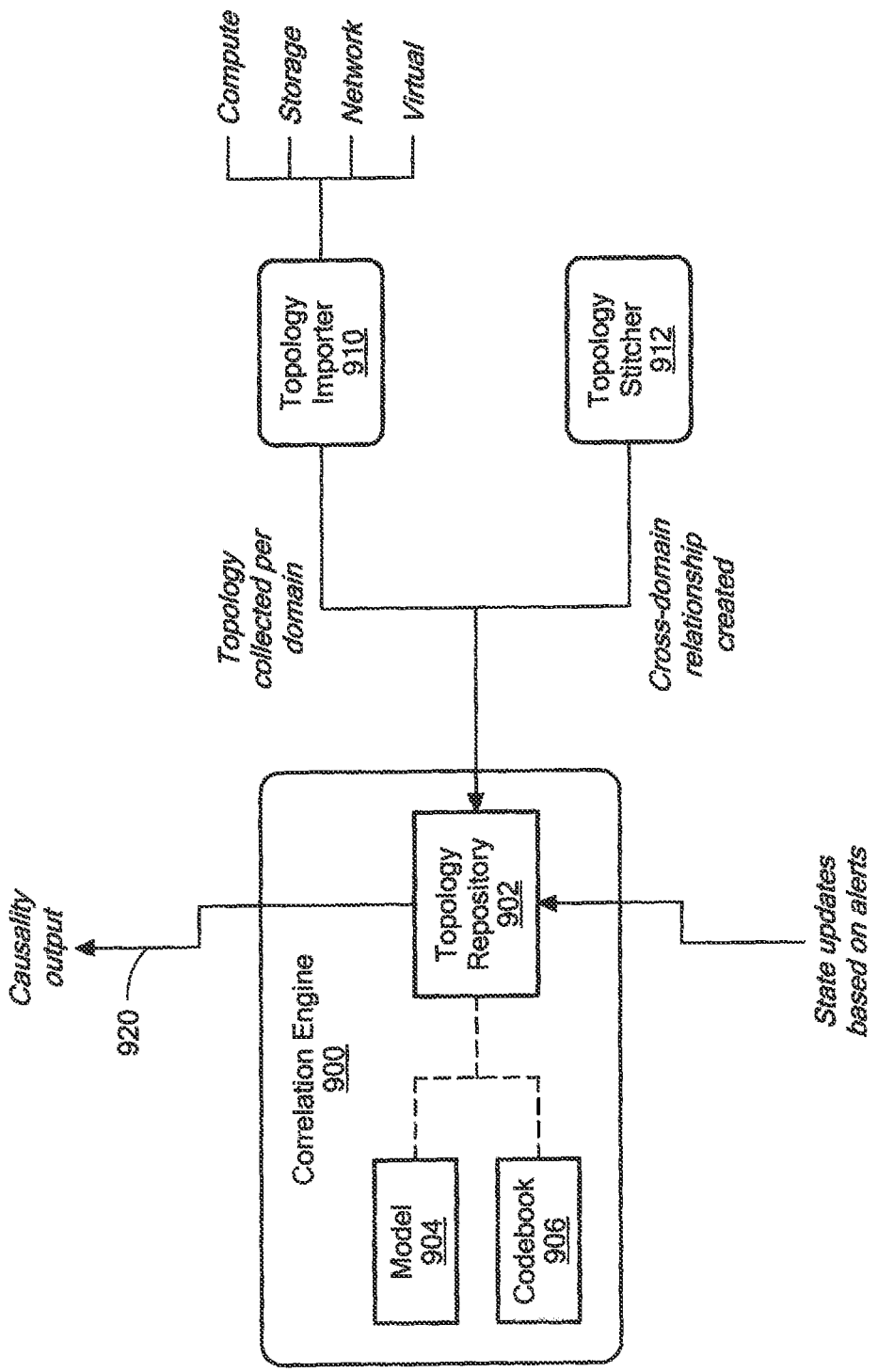
FIG. 9 is a schematic representation of components in the event correlation engine in the UIM/Operations product.

FIG. 9 shows exemplary implementation of the cross-domain event correlation in accordance with exemplary embodiments of the invention. An event correlation engine/module 900 includes a topology repository module 902 to store the infrastructural topology objects of all domains and their connections, the virtual layer objects, and their relationships with the infrastructural objects. The schema of the topology objects are driven by a predefined model 904. A codebook module 906 takes the repository data (topology, relationship, status) as the input and calculates the causality relationships between the events or alerts.

A topology importer module 910 obtains topology information for the system, such as the UCS, storage, network domains and the virtual layer, for transmission to the topology repository module 902. The topology importer creates and maintains topology objects and intra-domain relationships by periodically querying data sources and instantiating objects. A topology stitcher module 912 creates cross-domain relationships as described more fully below. In general, the topology stitcher 912 builds relationships among cross-domain objects, which enables the correlation engine 900 to correlate alerts from different domains.

State updates are preformed based upon the received alerts by mapping an alert to a state of a topology object. A so-called "event" is triggered by a certain condition of the state, and the correlation engine 900 determines the relationships among the events based on the model 904 and the topology relationships instantiated by the topology importer 910 and stitcher 912.

The causality output 920 from the topology repository 902 enables the system to fetch events, and then for each event, to query the related events. For example, if event A causes event B, then B will be returned in the list of getExplainedBy(A).

Figure 10:
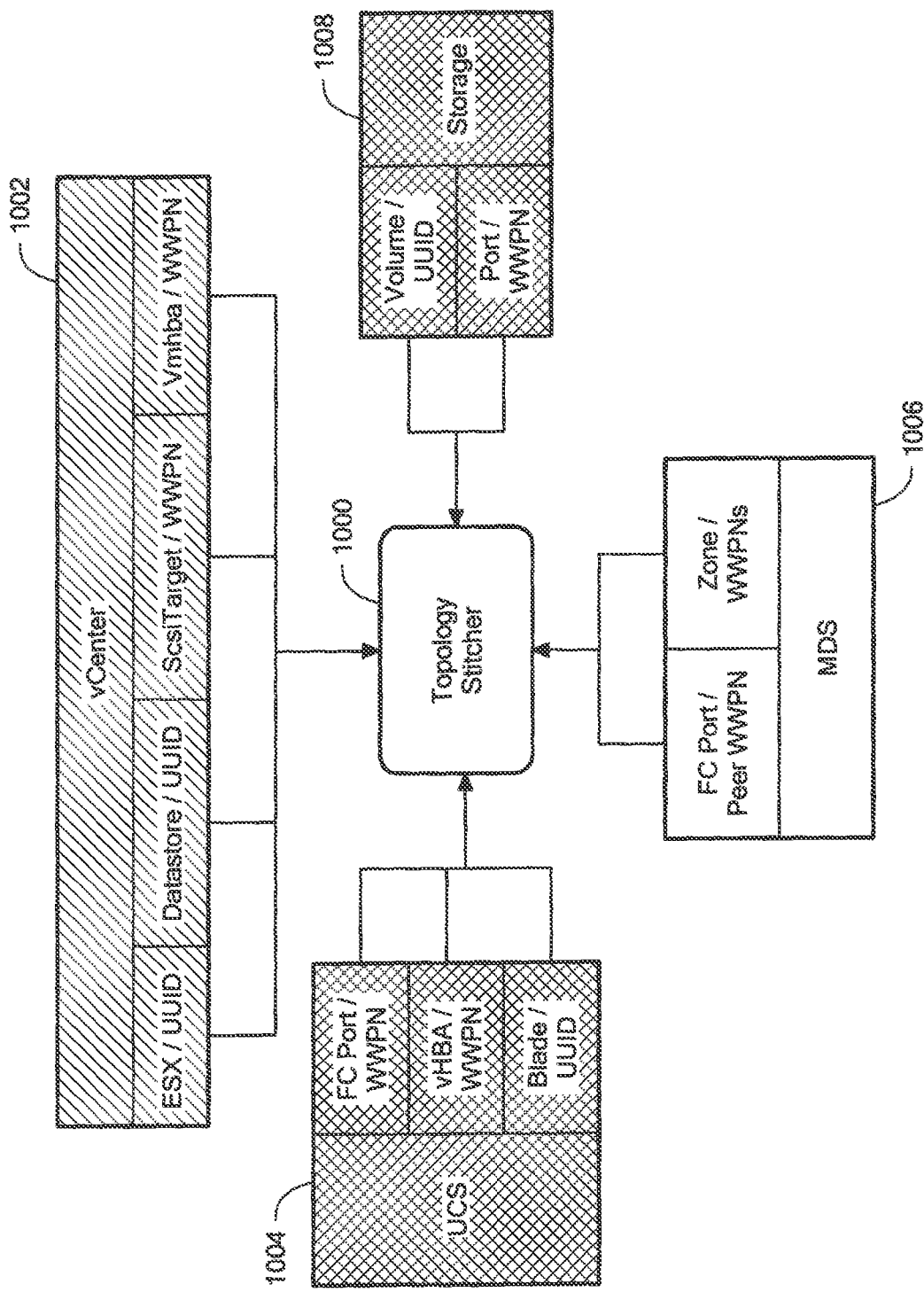
FIG. 10 is a schematic representation of a topology stitcher receiving information from components in the system.

FIG. 10 shows further detail for an exemplary topology stitcher 1000. The topology stitcher 1000 examines objects and their unique identifications from different domains. The input from vCenter 1002 to the topology stitcher, for example, is the UUID (Universally Unique IDentifier) of ESX and Datastore, as well as the WWPN (World Wide Port Name) of ScsiTarget and vmhba. The UUID and the WWPN are used as unique identifiers for the topology stitcher to match related objects from other domains.

Similarly, input from the UCS 1004 includes the WWPN for the FC ports, the WWPN for the vHBAs, and UUID for the blade. Input from the UCS 1006 includes the peer WWPN for FC ports and the WWPN for the zones. Input from the storage domain 1008 includes the UUID for the storage volumes and the WWPN for the storage ports.

In one embodiment, the input and the matching criteria are defined in an XML file, so that newly identified matching criteria can be easily added without code changes for the topology stitcher to perform its function. Below is an example:

<ScsiTarget>
  <matching targetClass="StoragePort" relationship="LayeredOver" isRelationshipset="true">
  <property selfProperty="WWPN" propertyInTarget="WWPN"/>
  </matching>
</ScsiTarget>

Figure 11:
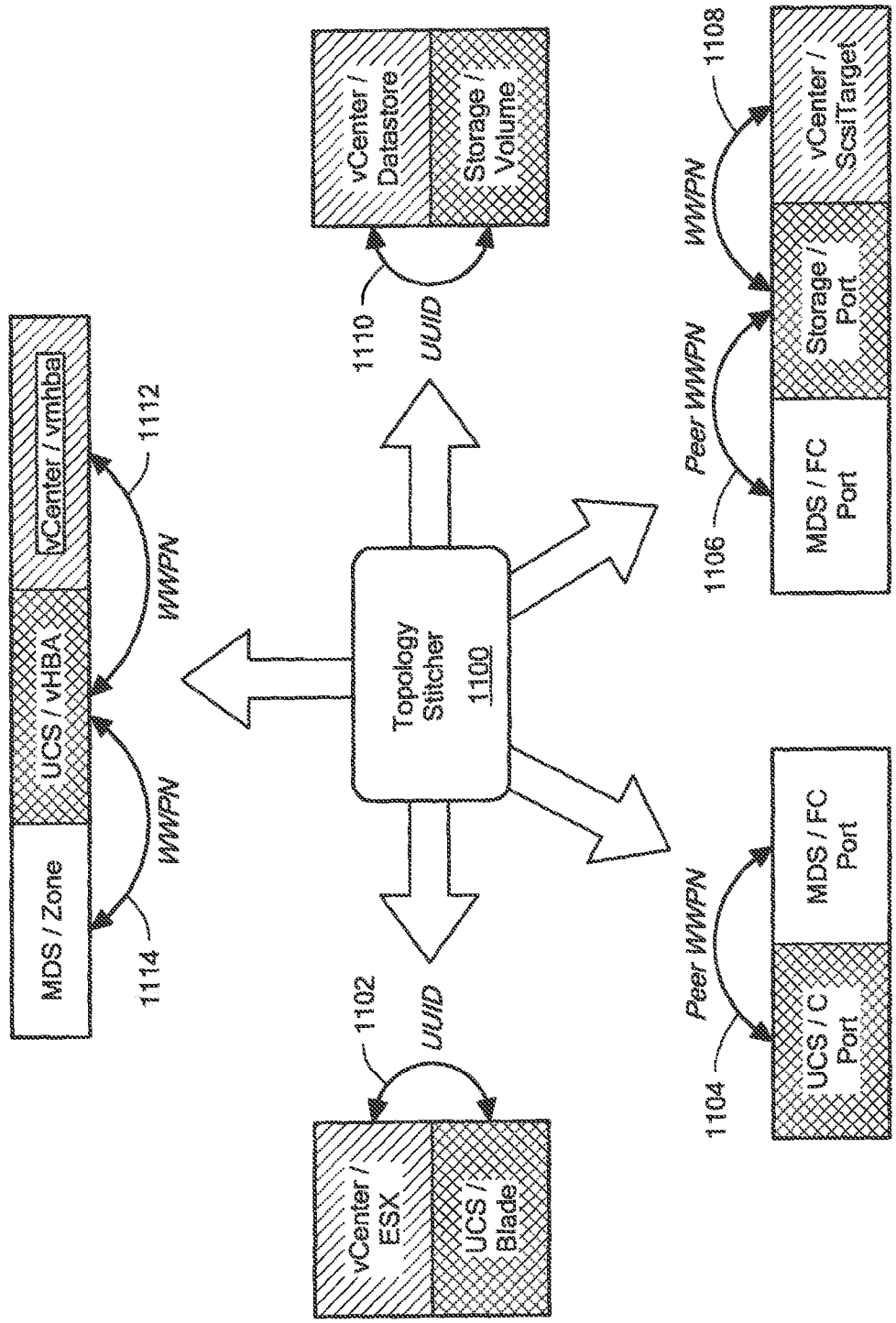
FIG. 11 is a schematic representation of output information from the topology stitcher.

This section of data instructs the topology stitcher to do the following: For objects in class ScsiTarget, find objects in StoragePort that have the same WWPN, and create a relationship called "LayeredOver" between them. In other words, a matching criteria is characterized by the following elements:
  classA
  classB
  A list of matching property pairs {propertyA1, propertyB1; propertyA2, propertyB2; ... }
  relationshipName
  isRelationshipSet—indicates whether the relationship is a one-to-one or one-to-many relationship FIG. 11 shows exemplary topology stitcher outputs. In one embodiment, the topology stitcher 1100 performs 7 matches, resulting in 5 identity groups of classes shown in the diagram. The 7 pairs of matches, counter-clockwise starting from the left, are as follows:

Matching UCS/Blade and vCenter/ESX using UUID 1102
Matching UCS/FCPort and MDS/FCPort using Peer WWPN 1104
Matching MDS/FCPort and Storage/Port using Peer WWPN 1106
Matching Storage/Port and vCenter/ScsiTarget using WWPN 1108
Matching Storage/Volume and vCenter/Datastore using UUID 1110
Matching UCS/vHBA and vCenter/vmhba using WWPN 1112
Matching MDS/Zone and UCS/vHBA using WWPN 1114

Exemplary pseudo code for generating matches is set forth below:

```
for each matching criteria {
    for each object objB in classB {
        generate a string key that concatenate the values of all
            matching properties: key=objB.propertyB1.value+
            delim+objB.propertyB2.value+...;
        save the object in a hash map, using the generated key:
            bMap.put(key, objB);
    }
    for each object objA in classA {
        generate a string key that concatenate the values of all
            matching properties: key=objA.propertyA1.value+
            delim+objA.propertyA2.value+...;
        lookup bMap using the key to see if matches are found:
            matchedObjBSet=bMap.get(key);
        for each objB in matchedObjBSet {
            if (isRelationshipSet) {objA.relationshipName.insert
                (objB); }
            else {objA.relationshipName=objB; }
        }
    }
}
```

Figure 11A:
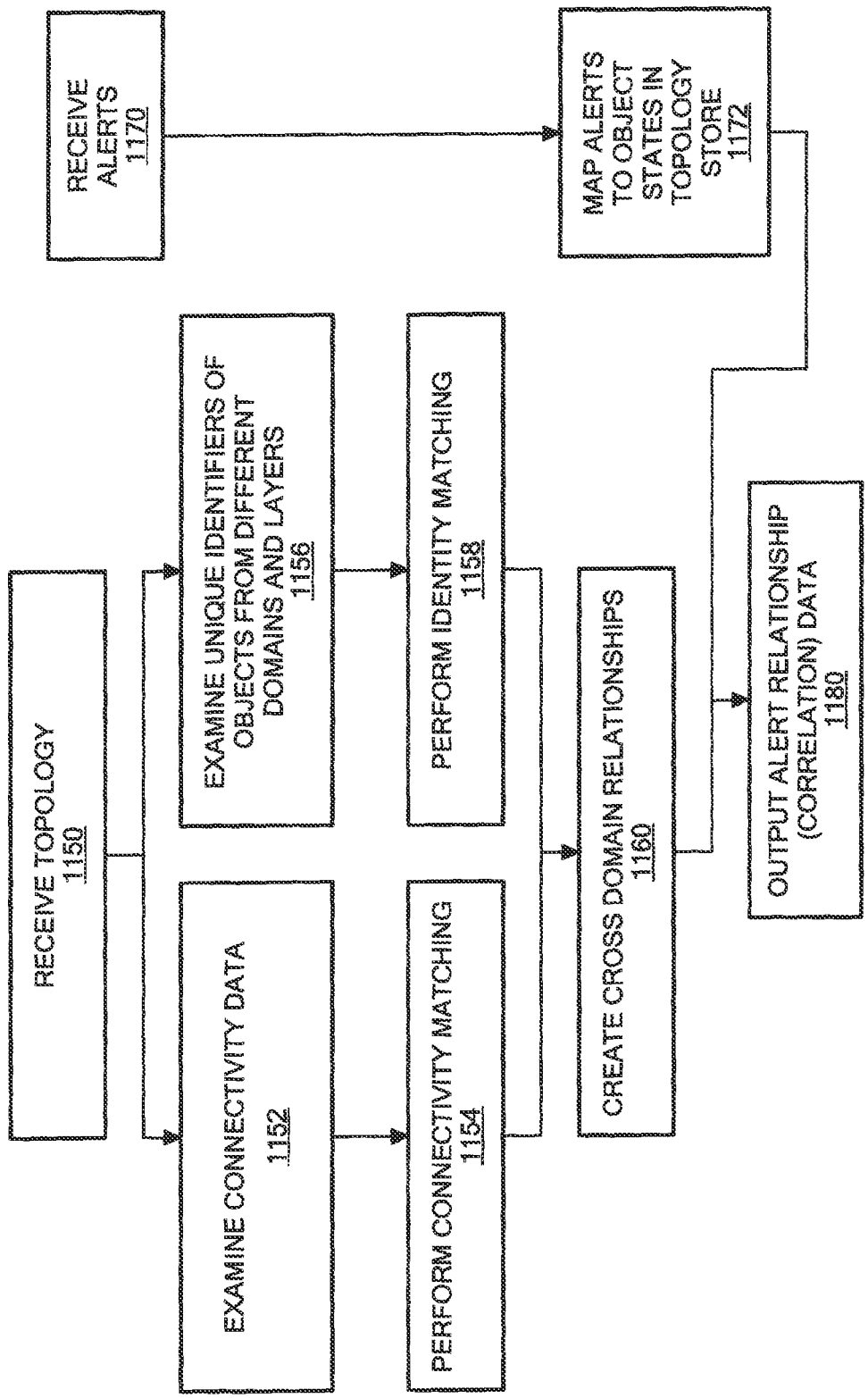
FIG. 11A is a schematic representation of the flow of event correlation processing implemented in the UIM/Operations product.

FIG. 11A shows an exemplary sequence of steps for providing cross-domain event correlation. In step 1150, topology data is retrieved from various infrastructure domains and the virtual layer. In step 1152, connectivity data is examined. For example, the port-to-port connectivity for the various components in various domain is examined. In step 1154, connectivity matching of corresponding components from various domains is performed.

In parallel, in step 1156, the objects are examined, regardless of whether there is alert, along with the unique identifiers from the domains. In step 1158, identity matching is performed based on the unique identifiers. In 1160, corresponding relationships are created based on the matches for cross-domain event correlation, as shown in FIG. 11.

In step 1170, an event in the system, such as a link failure, generates alerts in multiple domain that are received by the management domain. In step 1172, the alerts are mapped to object states in the topology store. In step 1180, relationships of alerts are made consumable by users.

Figure 12:
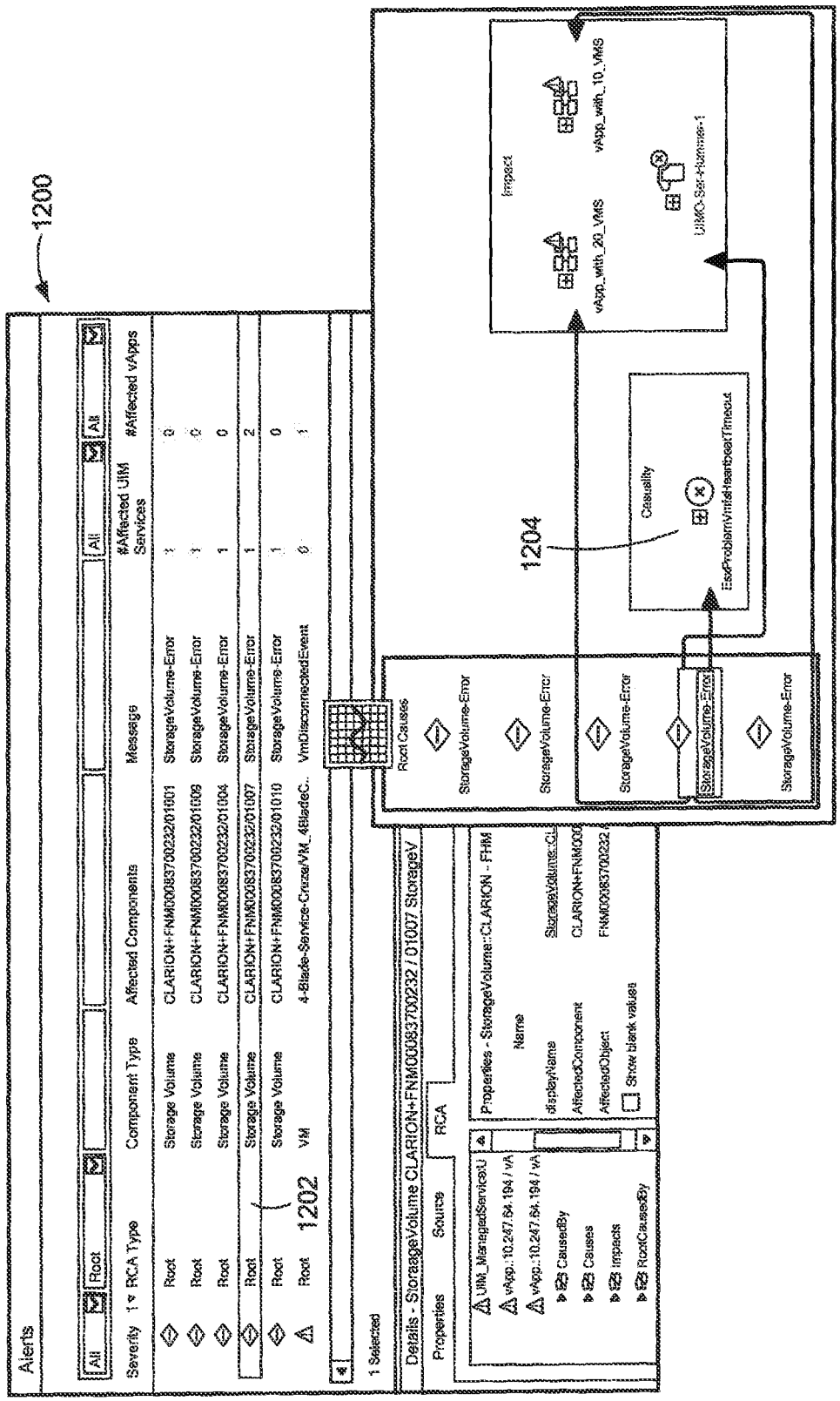
FIG. 12 is an exemplary display of cross-domain alert information.

FIG. 12 shows an exemplary screen display 1200 of an event correlation result between a Storage Volume alert 1202 and a Datastore alert: 1204. The Storage Volume alert 1202, called StorageVolume-Error, indicates the Storage Volume operational state is Error. The Datastore alert 1204, called EsxProblemVmfsHeartbeatTimeout, indicates the datastore is no longer reachable by the ESX. It is understood that the storage volume alert 1202 corresponds to the root cause of the alert.

Figure 13:
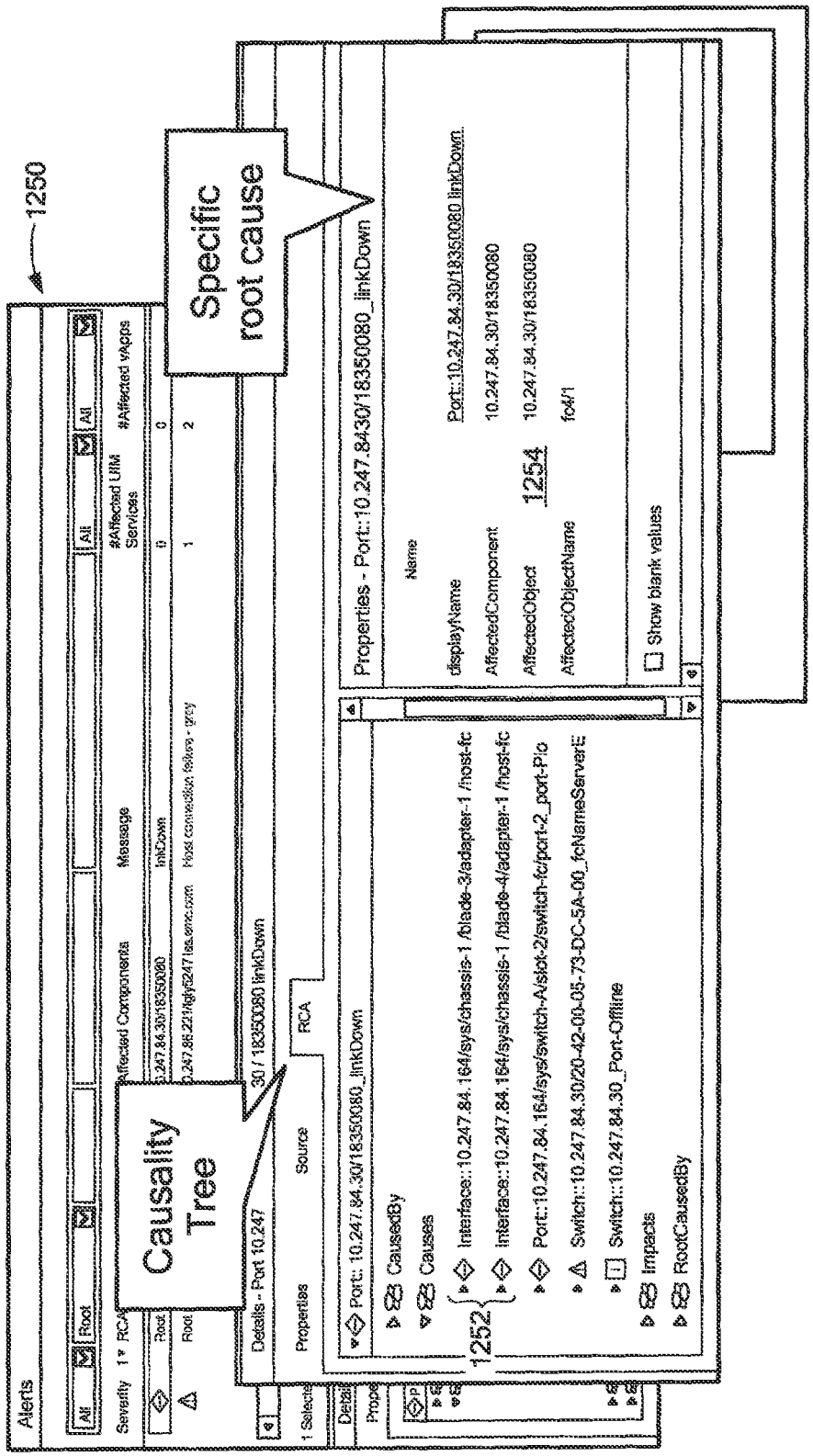
FIG. 13 it an exemplary display of alert causality and root cause.

FIG. 13 shows an exemplary screen display 1250 of a further event correlation result including the first level of the causality tree under the link down alert of an MDS/FCPort. This event correlates the following alerts:

The link down alert 1252 of two UCS/vHBA interfaces since they share the same zone with the MDS/FCPort, shown by the first two lines under the Causes node;

The link down alert 1254 of the matched UCS/FCPort, shown by the third line under the Causes node.

The following table illustrates the cross domain identity matching between the storage volume or LUN on storage arrays and the datastore in VMware vSphere.

| Domain | Storage | vSphere |
|---|---|---|
| Resource type | Storage Volume [LUN] | Datastore |
| Identifiers | UUID | UUID |
| Examples | 60:06:01:60:3B:40:<br>2D:00:42:2E:06:59:<br>4F:62:E1:11 | naa.<br>600601603B402d00422e06594f62e111 |

In another aspect of the invention, a system provides event correlation with causality equivalence. It is understood that event sources can generate large numbers of event types. For example, the Cisco UCSM has over 150 fault types. In exemplary embodiments of the invention, events are categorized into a set of causality-equivalence event classes. A correlation model is based only on the set of equivalence classes. With this arrangement, the complexity of the correlation model is reduced because the cardinality of the set of equivalence classes could be an order of magnitude less than the number of event types to be correlated. For example, dozens of blade faults fall into two causality-equivalence classes.

Figure 14:
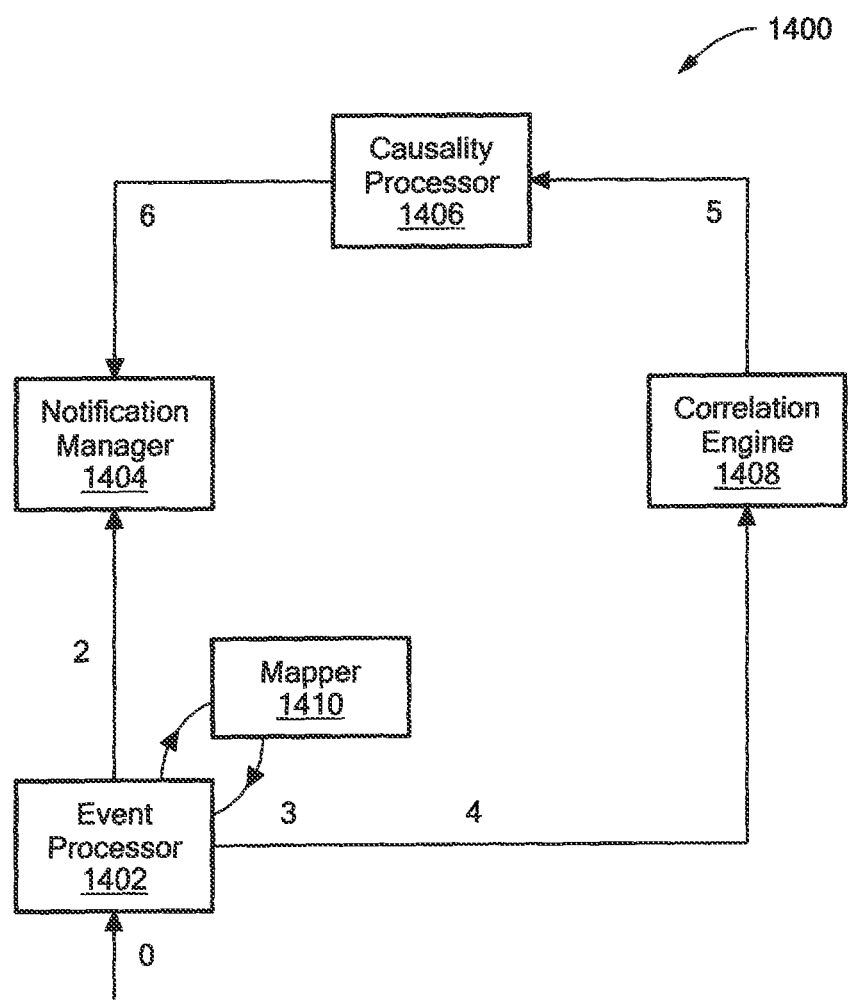
FIG. 14 is a schematic representation of an event correlation system having causality equivalence.

FIG. 14 shows exemplary system 1400 for event correlation with causality equivalence. An event processor 1402 receives events from various system components, as described above. A notification manager 1404 receives event information from the event processor 1402 and receives information from a causality processor 1406. A correlation engine 1408 receives event information from the event processor 1402. A mapper 1410 provides mapping information to the event processor for each event.

In general, the cross-domain event correlation shown in FIG. 9 complements the system 1400 of FIG. 14 both of which include a correlation engine. The causality output 920 of FIG. 9 goes to the causality processor 1406 in FIG. 14 and the send update based on alerts in FIG. 9 refers to the event processor 1402 in FIG. 14.

Figure 14A:
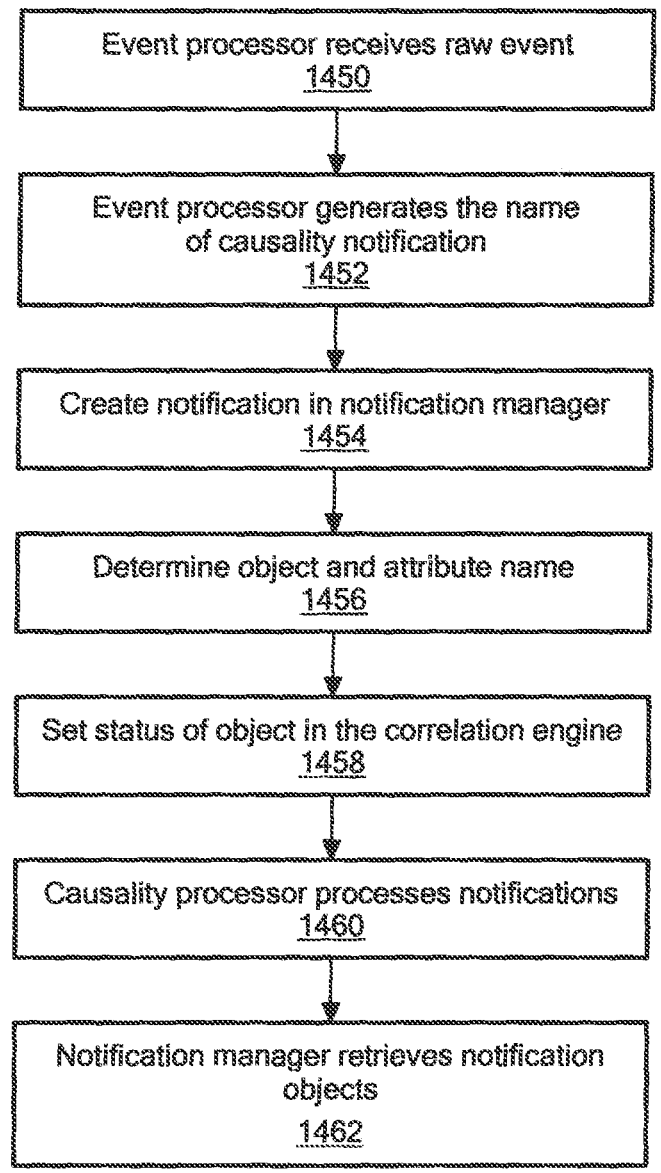
FIG. 14A is a flow diagram for implementing causality equivalence.

As shown in FIG. 14A, in step 1450, the event processor module 1402 receives raw events that were newly created or updated from the environment. The event processor 1402 than sets or clears the status of the topology object in the correlation engine and creates or deletes the notification in the notification manager 1404.

The event processor 1402 is governed by a mapper module 1410, which maps a raw event to its causality equivalence class, called "causality notification." In an exemplary embodiment, the mapper module 1410 is driven by an XML configuration file, such as below:

```
<eventList>
  <BladeServer InstanceNameFormat="AffectedComponent" InstanceNameFieldSeparator"/">
    <event name="compute-Blade-inoperable"           property="IsDown"
type="boolean" aggEventName="Down" />
    <event name="compute-Blade-biosPostTimeout"      property="IsDown"
type="boolean" aggEventName="Down" />
    <event name="compute-Blade-Post-failure"         property="IsDown"
```
type="boolean" aggEventName="Down" />
    <event name="compute-Blade-discoveryFailed"      property="IsUnreachable"
type="boolean" aggEventName="Unreachable" />
    <event name="compute-Blade-associationFailed"    property="IsUnreachable"
type="boolean" aggEventName="Unreachable" />
    <event name="compute-Blade-AssignedInaccessible" property="IsUnreachable"
type="boolean" aggEventName="Unreachable" />
    <event name="compute-Blade-AssignedMissing"      property="IsDown"
type="boolean" aggEventName="Down" />
    <event name="compute-Blade-Hard-Shutdown"        property="IsDown"
type="boolean" aggEventName="Down" />
    <event name="compute-Blade-Soft-Shutdown"        property="IsDown"
type="boolean" aggEventName="Down" />
    <event name="compute-Blade-UnassignedMissing"    property="IsDown"
type="boolean" aggEventName="Down" />
    <event name="compute-Blade-insufficientlyEquipped" property="IsDown"
type="boolean" aggEventName="Down" />
    <event name="compute-Blade-Unidentified"         property="IsDown"
type="boolean" aggEventName="Down" />
    <event name="compute-Blade-UnassignedInaccessible" property="IsUnreachable"
type="boolean" aggEventName="Unreachable" />
    <event name="bmc-inventory-failed"               property="IsUnreachable"
type="boolean" aggEventName="Unreachable" />
  </BladeServer>
  <UCSPIo InstanceNameFormat="AffectedComponent" InstanceNameFieldSeperator="/" >
    ...
  </UCSPIo>
</eventList>
```

The above portion of the mapper 1410 shows a total number of 14 blade events that are mapped to two causality equivalence classes (indicated by aggEventName in the XML file): Down and Unreachable.

It specifically provides fee following mapping functionality:

Given a raw event generate the name of the causality notification;

Given a raw event determine the name, type and attribute of the object in the correlation engine whose status should be updated.

In step 1452, the system generate the name of causality notification. The event processor 1402 needs to determine the name of the causality notification based on the information in the raw event. It uses the mapping information in the mapper 1410 to perform this operation.

For example, assume a raw event named compute-blade-inoperable on a blade named blade1. The mapper has mapping information indicating that this raw event will cause the correlation engine 1408 to generate the down event on the BladeServer object named blade1. The mapper 1410 generates the causality notification with the name in the form of TypeName::InstanceName::EventName. Based on the above example, the actual name is BladeServer::blade1::Down.

In step 1454, the system creates notifications in Notification Manager. For each raw event, the event processor 1402 creates first and second notifications is the notification manager 1404. The first is the raw notification representing the raw event using the name from the source as the name. The second is the causality notification with the name as described in the step 1452 above.

The event processor 1402 also creates a relationship named AggregatedBy/Aggregates between the raw notification and the corresponding causality notification objects. This two way relationship is used to trace back from the raw notification to the causality notification and vice-versa.

In step 1456, the system determines the object and attribute name. The event processor 1402 should set or clear the status attribute of the topology object for each raw event in the correlation engine 1408. The mapper module 1410 provides this mapping. Based on the event name fee mapper module 1410 provides the TypeName and the attribute name that needs to be updated. The instance name of the object is computed from the various attributes in the raw event and is governed by the InstanceNameFormat stated in the mapper XML file.

In step 1458, the system sets the status of object in the correlation engine. The event processor 1402 sets or clears the status of the attribute on the object determined in the step 3. If the state of the raw event is active, then the attribute state is set and the correlation engine 1408 will generate the corresponding causality notification. If the raw event state is InActive, then the attribute state is cleared and the correlation engine 1408 will clear the notification.

It is understood that the correlation engine 1408 maintains its own set of notifications generated or cleared based on the state of the topology. The (generated) active notifications in the correlation engine 1408 should match the causality notifications created in the notification manager.

The job of the correlation engine is to compute the relationships among the notifications based on the topology (relationship among the objects).

In step 1460, periodically, the causality processor 1406 performs a series of tasks. Initially, the causality processor 1406 pulls the list of causality notifications from the notification manager 1404. For each of causality notifications, the causality processor 1406 makes a query to the correlation engine 1408 to obtain the notifications that are caused by this one, and then updates the causality relationship between this notification and the ones caused by it.

In step 1462, the notification manager 1404 acts as an in-memory notification store. The following are two operations which are executed frequently. The notification manager 1404 retrieves a notification object based on the notification name and retrieves the notification objects sorted by the time the notifications were updated. The notification manager 1404 is configured to efficiently retrieve a notification by the notification name and also retrieve the raw notifications sorted by the updated time stamp.

Figure 15:
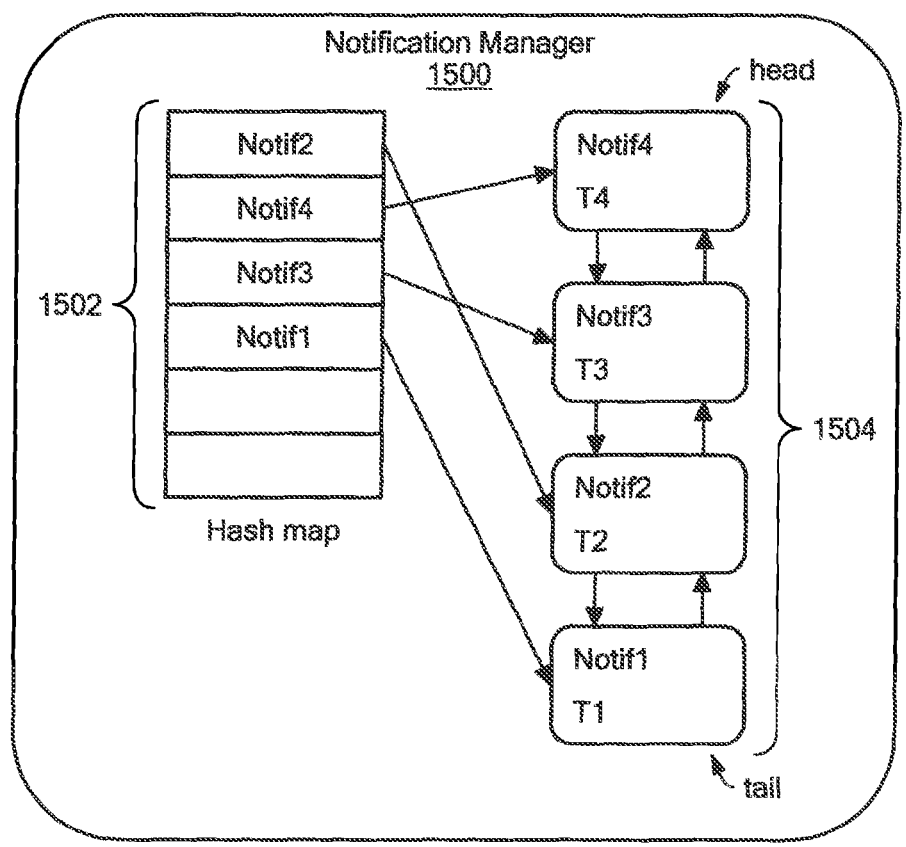
FIG. 15 is a schematic representation of components forming a part of the notification manager.

FIG. 15 shows components comprising the notification manager 1500. The notification manager 1500 includes a hash map 1502 that uses the notification name as a key pointing to the corresponding notification objects 1504, which can comprise a raw event notification or causality notification. The notification objects 1504 are linked together to form a doubly linked list. This double linked list is ordered based on the updated timestamp.

When a new notification is added to the notification list, an entry is added to the hash map 1502. The notification object is placed at the head of the doubly linked list 1504 and its timestamp is updated.

Figure 15A:
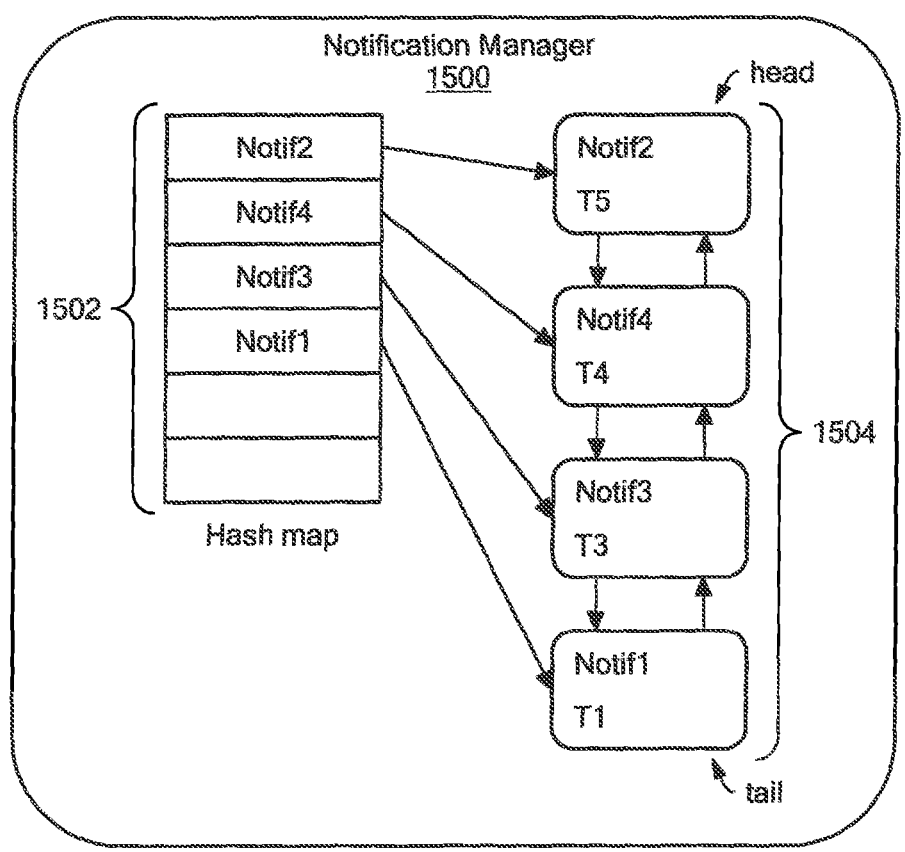
FIG. 15A shows the notification manager of FIG. 15 after an update.

To perform an update operation on the notification, the notification object is first located. The hash map 1502 lookup is performed to locate the notification object 1504. Then that notification is removed from its current position in the doubly linked list and moved to the head of the doubly linked list, as shown in FIG. 15A.

When a notification needs to be deleted, first the hash map 1502 lookup is performed to locate the notification object. The notification object is removed from the double linked list 1504 and the entry for that notification is removed from the hash map 1502. At any point of time, the notifications objects in the doubly linked list 1504 are maintained in the sorted order of the updated time. To retrieve the all the events sorted by the updated time, one can simply traverse the doubly linked list 1504 from the head to the tail. To retrieve an individual notification object, the hash map 1502 lookup operation is performed. Operations in the notification manager 1500 are linear time operations making the notification manager very efficient.

Figure 16:
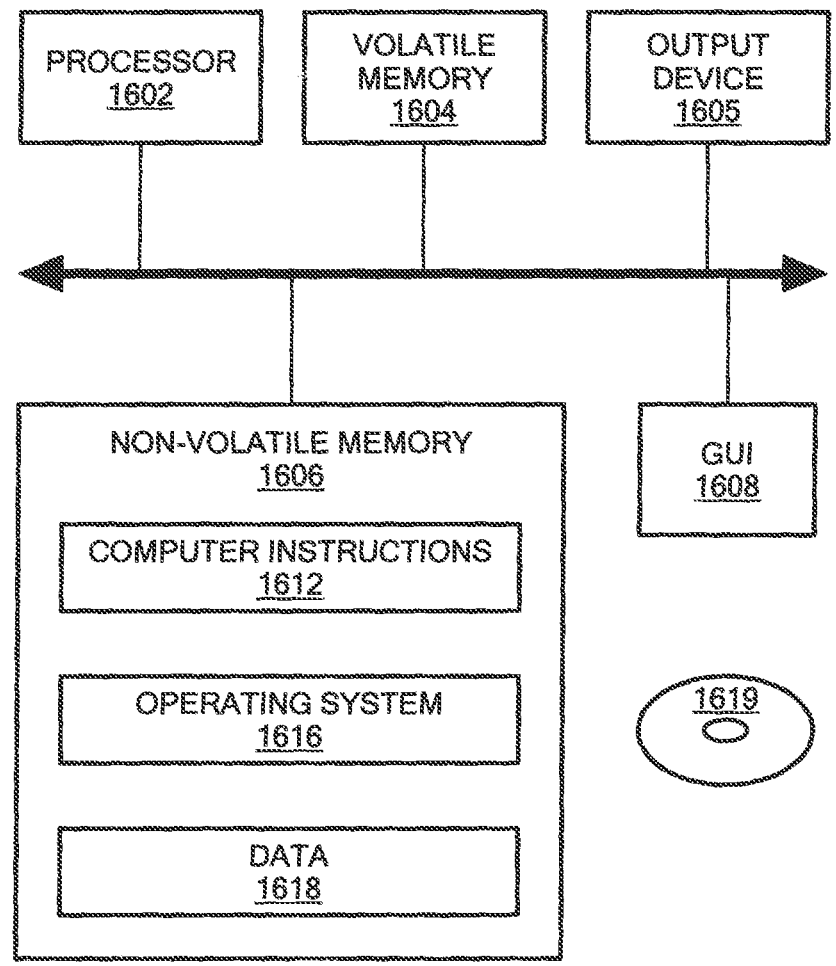
FIG. 16 is an exemplary computer that can perform at least a portion of the exemplary processing described herein.

FIG. 16 shows as exemplary computer that can perform at least a part of the processing described herein. A computer includes a processor 1602, a volatile memory 1604, an output device 1605, a non-volatile memory 1606 (e.g., hard disk), and a graphical user interface (GUI) 1608 (e.g., a mouse, a keyboard, a display, for example). The non-volatile memory 1606 stores computer instructions 1612, an operating system 1616 and data 1618, for example. In one example, the computer instructions 1612 are executed by the processor 1602 out of volatile memory 1604 to perform all or part of the processing described above. An article 1619 can comprise a machine-readable medium that stores executable instructions causing a machine to perform any portion of the processing described herein.

Processing is not limited to use with the hardware and software described herein and may find applicability in my computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by fee computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
receiving a raw event;
generating, using a computer processor, a raw notification and a causality notification for the raw event;
mapping the raw event to the causality notification which corresponds to a causality equivalence class in a plurality of causality equivalence classes;
creating a name for the causality notification including a type, instance, and event;
creating a two-way relationship between the raw notification and the causality notification;
updating a status attribute of a topology object corresponding to the raw event;
examining the causality notification to identify other related causality notifications;
updating a relationship of the causality notification to the other related causality notifications; and
retrieving a causality notification based on the name of the causality notification.

2. The method according to the claim 1, further including using a hash map to lookup the object corresponding to the raw event.

3. The method according to claim 2, wherein the hash map looks up the object by name.

4. The method according to claim 1, wherein raw event is generated by a blade.

5. The method according to claim 4, wherein the plurality of causality equivalence classes for the blade includes down and unreachable.

6. The method according to claim 1, wherein the name of the causality notification includes names for type, instance, and event.

7. The method according to claim 1, further including retrieving the causality notifications by time stamp.

8. A system, comprising;
a notification manager to manage a raw notification for a raw event and a causality notification for the raw event, wherein the causality notification corresponds to a causality equivalence class in a plurality of causality equivalence classes;
correlation engine for maintaining a status of topology objects and for computing relationships among notifications generated on the state of the topology objects;
an event processor to generate from the raw event the raw notification and the causality notification and to update the status of the topology objects in the correlation engine; and
a causality processor to retrieve further causality notifications caused by the causality notification generated by the raw event and to update causality relationships between the further causality notifications and the causality notification generated by the raw event.

9. The system according to claim 8, wherein the notification manager includes a hash map to look up the raw notification and the causality notification.

10. The system according to claim 9, wherein the hash map looks up the object by name.

11. The system according to claim 8, wherein raw event is generated by a blade.

12. The system according to claim 11, wherein the plurality of causality equivalence classes for the blade includes down and unreachable.

13. The system according to claim 8, wherein the name of the causality notification includes names for type, instance, and event.

14. An article, comprising:
a non-transitory computer-readable medium comprising stored instructions that enable a machine to perform:
receiving a raw event;
generating, using a computer processor, a raw notification and a causality notification for the raw event;
mapping the raw event to the causality notification which corresponds to a causality equivalence class in a plurality of causality equivalence classes;
creating a name for the causality notification including a type, instance, and event;
creating a two-way relationship between the raw notification and the causality notification;
updating a status attribute of a topology object corresponding to the raw event;
examining the causality notification to identify other related causality notifications;
updating a relationship of the causality notification to the other related causality notifications; and
retrieving a causality notification based on the name of the causality notification.

15. The article according to claim 14, further including instructions for using a hash map to lookup the object corresponding to the raw event.

16. The article according to claim 14, wherein raw event is generated by a blade.

17. The article according to claim 16, wherein the plurality of causality equivalence classes for the blade includes down and unreachable.

18. The article according to claim 14, wherein the name of the causality notification includes names for type, instance, and event.

19. The article according to claim 14, further including instructions for retrieving the causality notifications by time stamp.

* * * * *